(12) United States Patent
Cheng

(10) Patent No.: US 8,482,823 B2
(45) Date of Patent: Jul. 9, 2013

(54) CONTACT-TYPE IMAGE SCANNER AND SCAN CONTROLLING METHOD THEREOF

(75) Inventor: Jyi-Fang Cheng, Taoyuan Hsien (TW)

(73) Assignee: Teco Image System Co., Ltd., Taoyuan Hsien (TW)

( * ) Notice: Subject to any disclaimer, the term of this patent is extended or adjusted under 35 U.S.C. 154(b) by 333 days.

(21) Appl. No.: 12/902,064

(22) Filed: Oct. 11, 2010

(65) Prior Publication Data

US 2011/0149358 A1 Jun. 23, 2011

(30) Foreign Application Priority Data

Dec. 22, 2009 (TW) .............................. 98144329 A

(51) Int. Cl.
*H04N 1/04* (2006.01)
(52) U.S. Cl.
USPC ............ 358/505; 358/475; 358/474; 358/497
(58) Field of Classification Search
USPC ........................ 358/505, 475, 474, 497, 498
See application file for complete search history.

(56) References Cited

U.S. PATENT DOCUMENTS 4,947,246 A * 8/1990 Kikuchi .......................... 348/70

* cited by examiner

*Primary Examiner* — Houshang Safaipour

(57) ABSTRACT

A contact-type image scanner includes an illumination unit, a control unit and a photo-sensing unit. The illumination unit includes a first, a second and a third light source for respectively emitting different color light beams on an original surface. The control unit is in communication with the illumination unit for controlling on durations of the light sources. In response to a first start pulse and a second start pulse, the first light source and the second light source are turned on for a first on duration and a second on duration respectively, wherein the second light source is turned on immediately after the first light source is turned off or after the first light source is turned off for a delaying time. In response to a third start pulse, the first, second and third light sources are simultaneously turned on for a first minor on duration, a second minor on duration and a third minor on duration, respectively. The photo-sensing unit obtains a first image data value during the first on duration, obtains a second image data value during a second on duration and obtains a third image data during the first, second and third minor on durations.

19 Claims, 9 Drawing Sheets

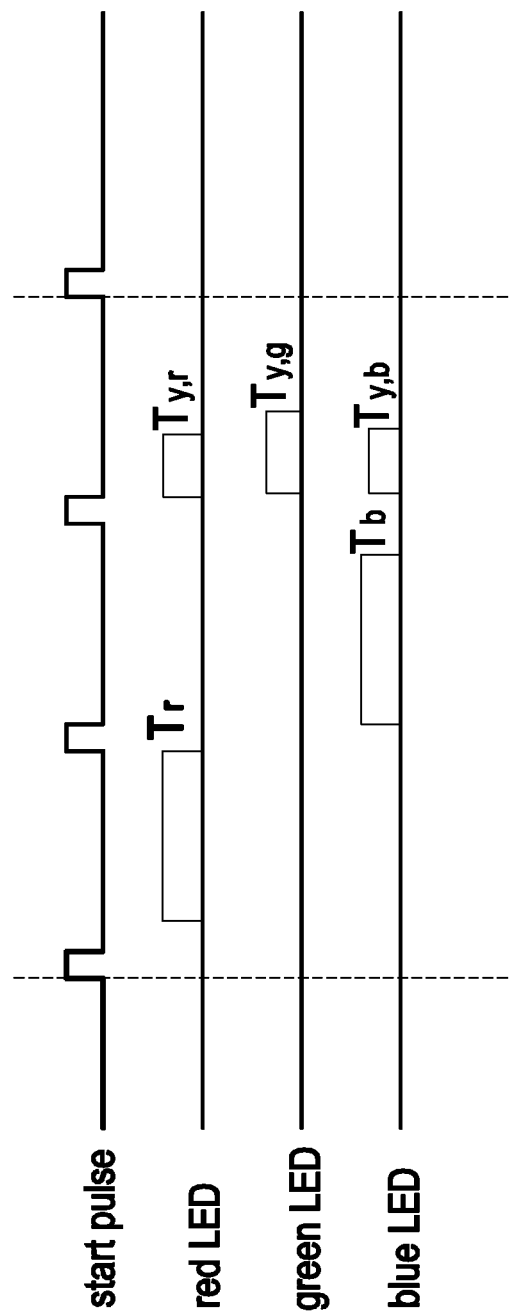

CONTACT-TYPE IMAGE SCANNER AND SCAN CONTROLLING METHOD THEREOF

CLAIM OF PRIORITY

This application claims priority to Taiwanese Patent Application No. 098144329 filed on Dec. 22, 2009.

FIELD OF THE INVENTION

The present invention relates to an image scanner, and more particularly to a contact-type image scanner. The present invention also relates to a scan controlling method of the contact-type image scanner.

BACKGROUND OF THE INVENTION

A contact image sensor (CIS) is one of linear sensors. The contact image sensor can scan a planar picture or document into an electronic file, which is then stored, displayed, processed or transmitted. Since the optical source, the lens and other components are integrated into a single module, the contact image sensor is light and slim. Moreover, since the contact image sensor is easily assembled, the contact image sensor is cost-effective.

FIG. 1 is a schematic view illustrating the architecture of a contact image sensor used in a contact-type image scanner according to the prior art. As shown in FIG. 1, the contact image sensor comprises a red LED 10, a green LED 11, a blue LED 12, a light-guiding member 13, a rod lens array 14 and a linear sensor array 15. The linear sensor array 15 is operated according to start pulses. During operation of the contact image sensor, the red LED 10, the green LED 11 and the blue LED 12 are successively turned on for each start pulse. During the on duration of each LED, the light emitted by the LED is guided to a be-scanned original 20 by the light-guiding member 13. The light is reflected by the original 20 and then focused on the linear sensor array 15 by the rod lens array 14. When the contact image sensor is linearly moved to transversely scan the original 20, the image information of three primary colors will be acquired.

FIG. 2 is a schematic timing waveform diagram illustrating the relations between the start pulses and the on durations of respective LEDs according to a prior art technology. In response to a first start pulse, the red LED 10 is turned on for an on duration Tr. Next, in response to a second start pulse, the green LED 11 is turned on for an on duration Tg. Next, in response to a third start pulse, the blue LED 12 is turned on for an on duration Tb. Since the contact image sensor is continuously and linearly moved to perform a scanning operation while sequentially turning on the light sources, a time lag is produced between the period of reading the red image (in response to the first start pulse) and the period of reading the green image (in response to the second start pulse). Similarly, two time lags are produced between the period of reading the red image (in response to the first start pulse) and the period of reading the blue image (in response to the third start pulse). Due to the time lag resulted from sequential turn-on operation while continuously moving the contact image sensor, a color misregistration problem occurs.

U.S. Pat. No. 6,545,777 disclosed an image reading apparatus with reduced color misregistration by adjusting the timing of turning on each LED. The relations between the start pulses and the on durations of respective LEDs are shown in FIG. 3. By controlling the end of the red LED on duration Tr to be synchronous with the rising edge of the second pulse, the color misregistration for each scan line is slightly reduced when comparison with FIG. 2. That is, the overall time interval b is slightly shorter than the overall time interval a. Since the scanning speed is gradually increased, the color misregistration is still unsatisfied.

U.S. Pat. No. 7,535,606 disclosed a RYB (red-luminance-blue) sampling method of a contact-type image scanner. The relations between the start pulses and the on durations of respective LEDs are shown in FIG. 4. The equations mapping RGB to YCbCr can be rearranged to yield Cr and Cb as the functions: $Y=0.29900 \times R+0.58700 \times G+0.11400 \times B$, $Cb=-0.16874 \times R-0.33126 \times G+0.50000 \times B=0.56433 \times (B-Y)$; and $Cr=0.50000 \times R-0.41869 \times G-0.08131 \times B=0.71327 \times (R-Y)$.

As shown in FIG. 4, the red LED is turned on for an on duration Tr in response to the first start pulse, and the blue LED is turned on for an on duration Tb in response to the third start pulse. In response to the second start pulse, the red, green and blue LEDs are sequentially turned on, wherein the red LED on duration $Ty,r=0.299 \times Tr$, the green LED on duration $Ty,b=0.587 \times Tg$, and the blue LED on duration $Ty,b=0.114 \times Tb$. As such, a Y value is acquired. After the RYB value is acquired, the Y, Cr and Cb can be deduced according to the following equations: $Cr=0.71327 \times (R-Y)$ and $Cb=0.56433 \times (B-Y)$. In practice, the color misregistration for each scan line is about a three-pulse length. The time lag resulted from sequential illumination of the red, green and blue LEDs produces a scanning position error of the three primary colors.

Therefore, there is a need of providing a contact-type image scanner and a scan controlling method so as to obviate the drawbacks encountered from the prior art.

SUMMARY OF THE INVENTION

It is an object of the present invention to provide a contact-type image scanner and a scan controlling method of the contact-type image scanner. By controlling the on durations and sequences of the red, green and blue LEDs, the scanning position error of the three primary colors is reduced and the color misregistration is minimized.

In accordance with an aspect of the present invention, there is provided a contact-type image scanner. The contact-type image scanner includes an illumination unit, a control unit and a photo-sensing unit. The illumination unit includes a first light source, a second light source and a third light source for respectively emitting different color light beams on an original surface. The control unit is in communication with the illumination unit for controlling on durations of the first light source, the second light source and the third light source. In response to a first start pulse, the first light source is turned on for a first on duration. In response to a second start pulse, the second light source is turned on for a second on duration, wherein the second light source is turned on immediately after the first light source is turned off or after the first light source is turned off for a delaying time. In response to a third start pulse, the first, second and third light sources are simultaneously turned on for a first minor on duration, a second minor on duration and a third minor on duration, respectively. The photo-sensing unit is used for receiving the light beams reflected from the original surface and outputting an image message. The photo-sensing unit obtains a first image data value during the first on duration, obtains a second image data value during a second on duration and obtains a third image data during the first, second and third minor on durations.

In accordance with another aspect of the present invention, there is provided a scan controlling method of a contact-type image scanner. Firstly, a first light source, a second light source and a third light source are provided to linearly move with respect to an original surface and respectively emit different color light beams on the original surface. In response to a first start pulse, the first light source is turned on for a first on duration, and the light beam reflected from the original surface is received, thereby generating a first image data value. In response to a second start pulse, the second light source is turned on for a second on duration, and the light beam reflected from the original surface is received, thereby generating a second image data value, wherein the second light source is turned on immediately after the first light source is turned off or after the first light source is turned off for a delaying time. In response to a third start pulse, the first, second and third light sources are simultaneously turned on for first, second and third minor on durations, respectively, and the light beams reflected from the original surface are received to obtain a third image data value.

The above contents of the present invention will become more readily apparent to those ordinarily skilled in the art after reviewing the following detailed description and accompanying drawings, in which:

BRIEF DESCRIPTION OF THE DRAWINGS

FIG. 6A is a schematic timing waveform diagram illustrating the relations between the start pulses and the on durations of respective LEDs according to a scan controlling method of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a contact-type image scanner and a scan controlling method of the contact-type image scanner. By controlling the on durations and the turn-on sequences of the red, green and blue LEDs, the scanning position error of the three primary colors is reduced and the color misregistration is minimized.

Figure 1:
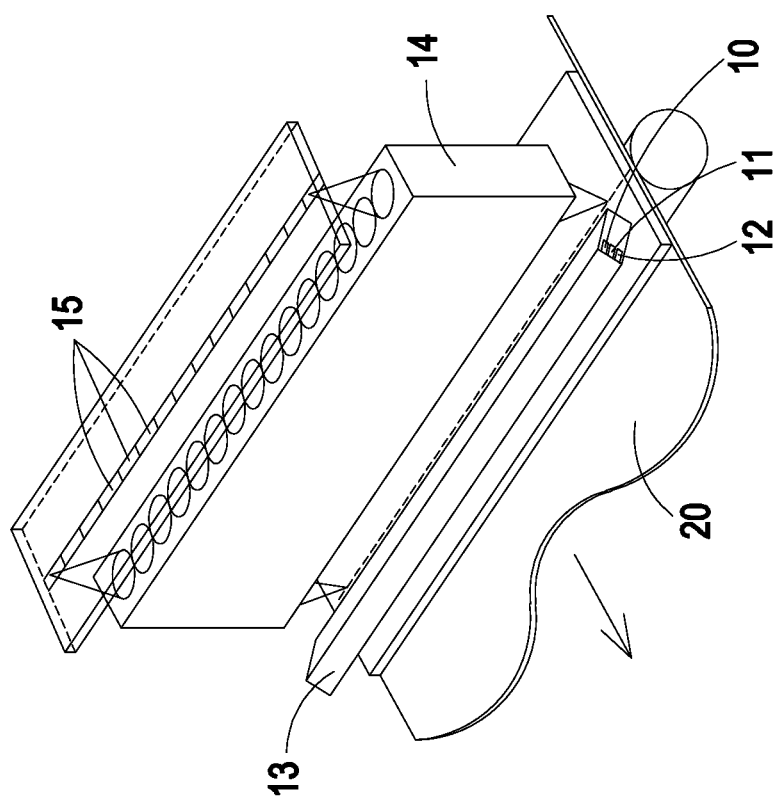
FIG. 1 is a schematic view illustrating the architecture of a contact image sensor used in a contact-type image scanner according to the prior art.
Figure 2:
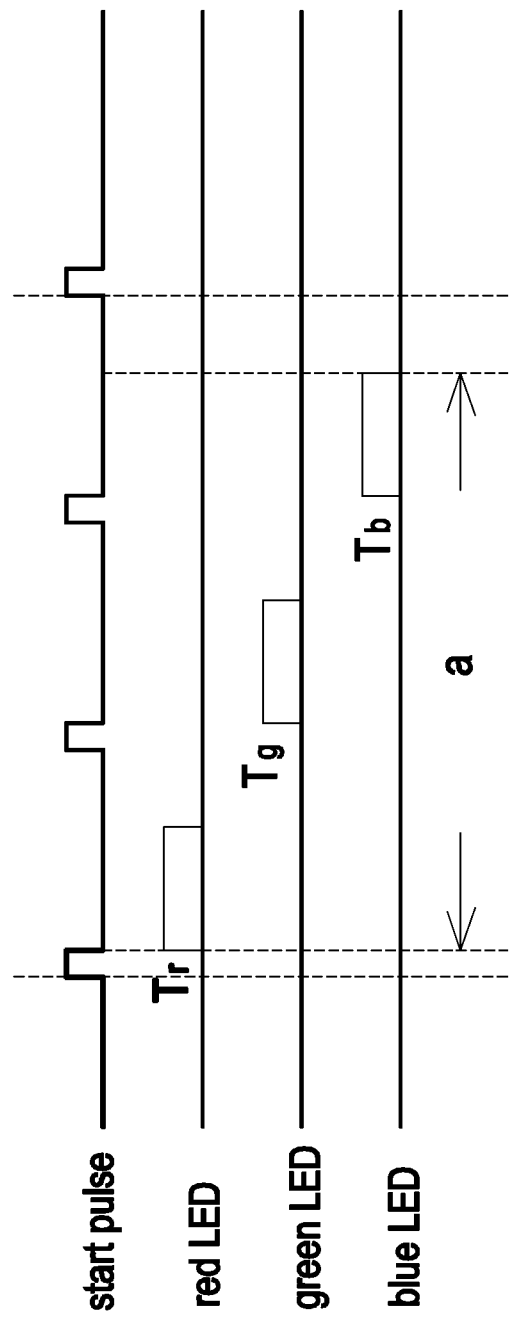
FIG. 2 is a schematic timing waveform diagram illustrating the relations between the start pulses and the on durations of respective LEDs according to a prior art technology.
Figure 3:
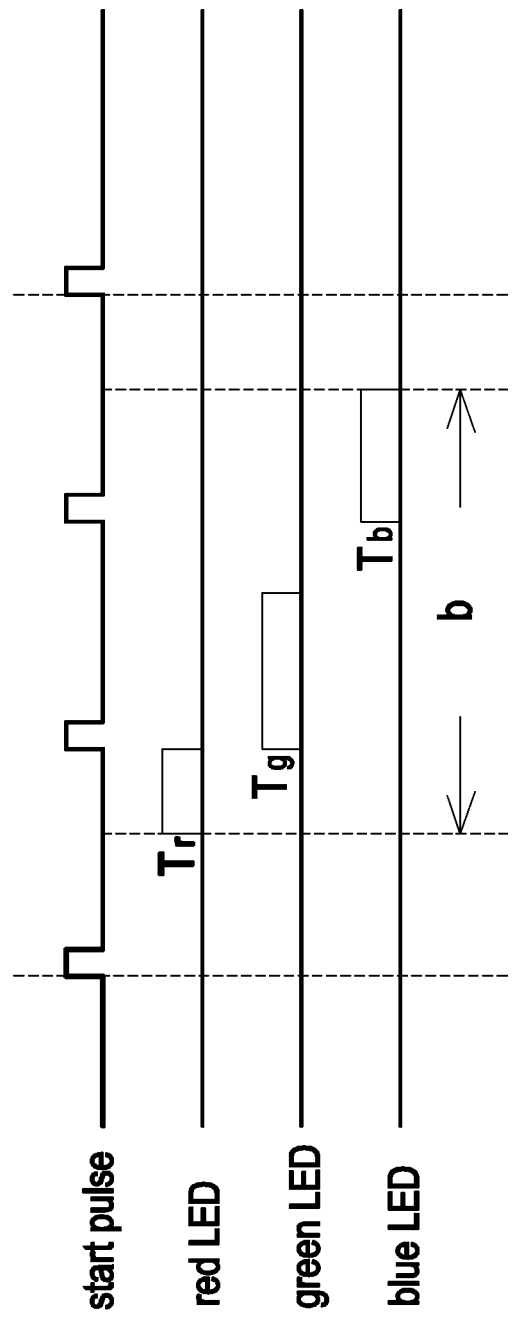
FIG. 3 is a schematic timing waveform diagram illustrating the relations between the start pulses and the on durations of respective LEDs according to another prior art technology.
Figure 4:
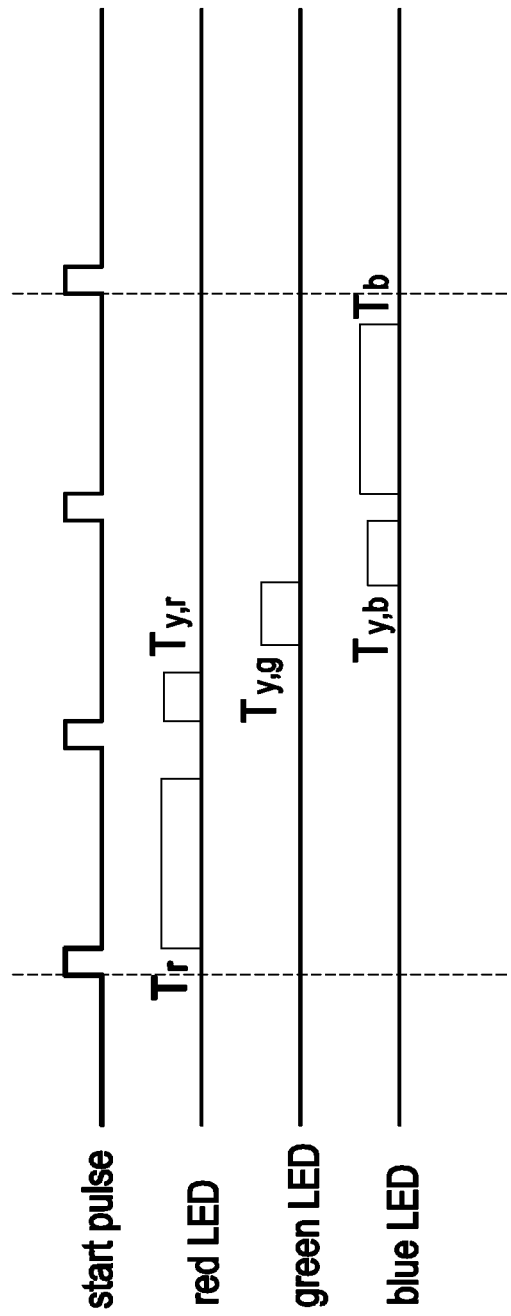
FIG. 4 is a schematic timing waveform diagram illustrating the relations between the start pulses and the on durations of respective LEDs according to another prior art technology.
Figure 5:
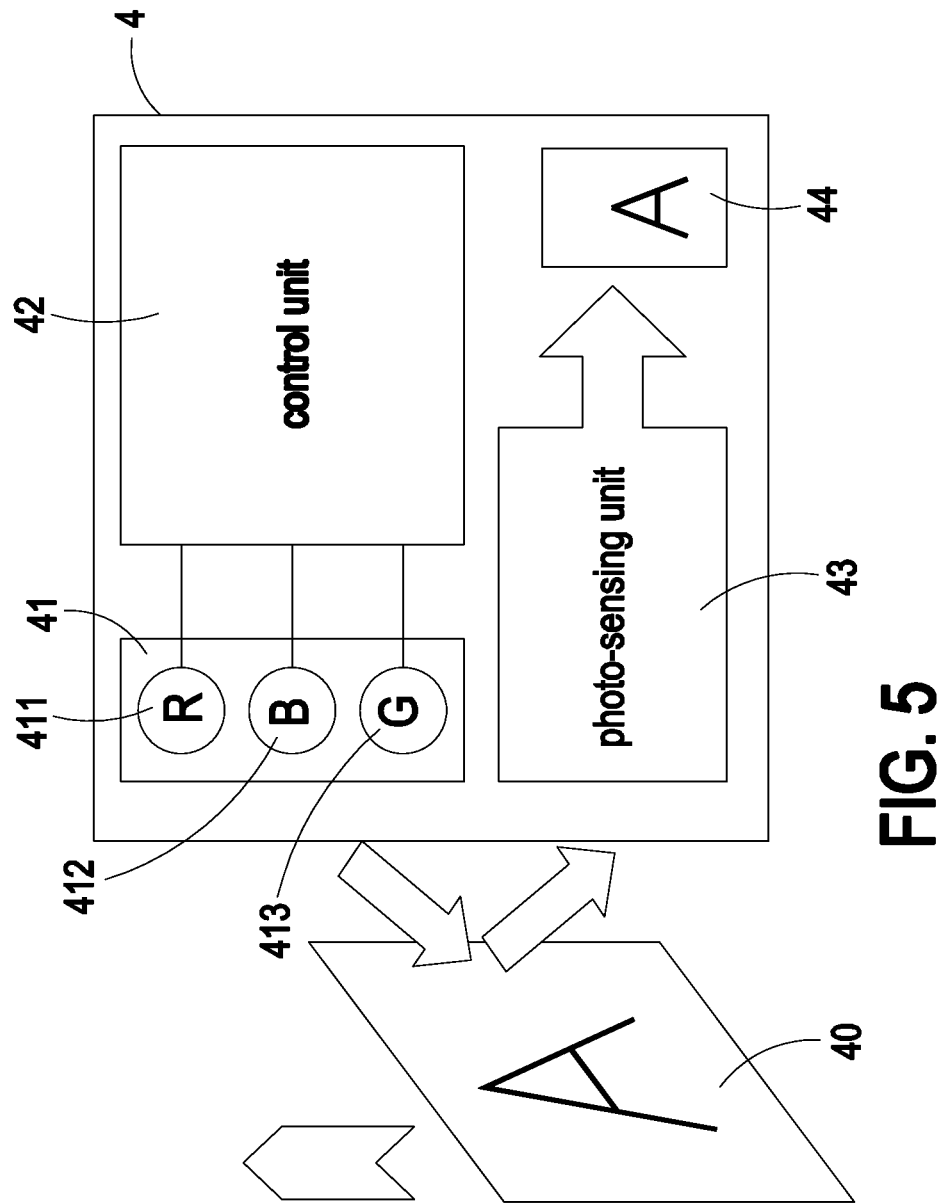
FIG. 5 is a schematic functional block diagram illustrating a contact-type image scanner according to an embodiment of the present invention.

FIG. 5 is a schematic functional block diagram illustrating a contact-type image scanner according to an embodiment of the present invention. As shown in FIG. 5, the contact-type image scanner 4 comprises an illumination unit 41, a control unit 42 and a photo-sensing unit 43. The illumination unit 41 comprises a first light source 411, a second light source 412 and a third light source 413 for respectively emitting different color light beams on an original surface 40. The control unit 42 is in communication with the illumination unit 41 for controlling the on durations and illuminating sequences of the first light source 411, the second light source 412 and the third light source 413. When the light emitted by the first light source 411, the second light source 412 or the third light source 413 is projected on the original surface 40, the light is reflected from the original surface 40. After the reflected light is received by the photo-sensing unit 43, the photo-sensing unit 43 issues an image message 44. In this embodiment, the first light source 411 is a red LED, the second light source 412 is a blue LED, and the third light source 413 is a green LED. That is, the on durations and illuminating sequences of the red LED, blue LED and green LED are controlled by the control unit 42.

Since the brightness values of the light beams emitted form the three primary light sources are usually different because of the production processes or inherent properties, the on durations and the turn-on sequences of the three primary light sources should be optimized when a color scanning operation is performed. In such manner, the illuminating energy of the three primary light sources will be uniform and the scanning quality is enhanced. For acquiring the optimal data ranges, the on durations of the first light source 411 (red LED), the second light source 412 (blue LED) and the third light source 413 (green LED) are optimized, thereby acquiring a first on duration Tr, a second on duration Tb and a third on duration Tr, respectively. Each of the first on duration Tr, the second on duration Tb and the third on duration Tr is shorter than the pulse period.

Figure 6B:
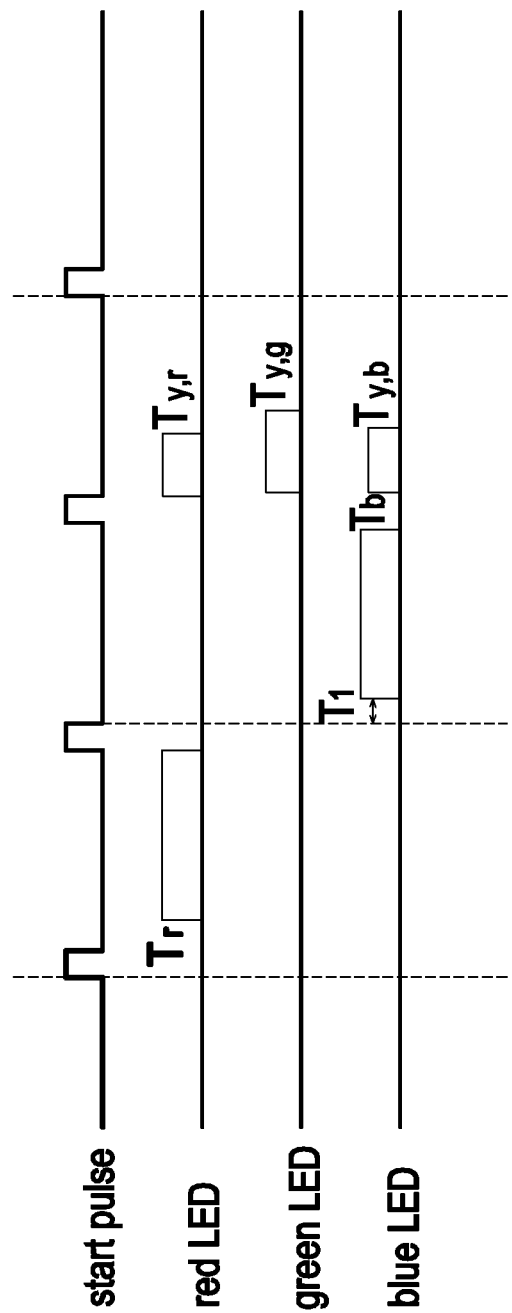
FIG. 6B is a schematic timing waveform diagram illustrating the relations between the start pulses and the on durations of respective LEDs according to another scan controlling method of the present invention.

FIG. 6A is a schematic timing waveform diagram illustrating the relations between the start pulses and the on durations of respective LEDs according to a scan controlling method of the present invention. In response to a first start pulse, the first light source 411 (red LED) is turned on for a first on duration Tr. Sequentially, in response to a second start pulse, the second light source 412 (blue LED) is turned on for a second on duration Tb. In this embodiment, the first light source 411 (red LED) is turned off when the second start pulse is at a rising edge. That is, the end of the first on duration Tr is synchronous with the rising edge of the second start pulse. After the first light source 411 (red LED) is turned off, the second light source 412 (blue LED) is turned on for the second on duration Tb. In some embodiments, as shown in FIG. 6B, the time spot of turning on the second light source 412 (blue LED) is delayed by a delaying time T1 after the falling edge of the second start pulse. That is, after the first light source 411 (red LED) is turned off for the delaying time T1, the second light source 412 (blue LED) is turned on.

Sequentially, in response to a third start pulse, the first light source 411 (red LED), the second light source 412 (blue LED) and the third light source 413 (green LED) are simultaneously turned on. The first light source 411 (red LED) is turned on for a first minor on duration Ty,r. The second light source 412 (blue LED) is turned on for a second minor on duration Ty,b. The third light source 413 (green LED) is turned on for a third minor on duration Ty,b. In accordance with a key feature of the present invention, the image message in the RGB color space is converted into the image message in the YCbCr color space. As such, the first minor on duration Ty,r=0.299×Tr, the second minor on duration Ty,b=0.114×Tb, and the third minor on duration Ty,g=0.587×Tg. During the contact-type image scanner 4 is moved on the original surface 40, the photo-sensing unit 43 may read out image data from corresponding positions of the original surface 40. For example, a first image data value R is obtained during the first light source 411 (red LED) is turned on for the first on duration Tr, a second image data value B is obtained during second light source 412 (blue LED) is turned on for a second on duration Tb, and a third image data value Y is obtained during the three light sources are turned on. As a consequence, the equations mapping RGB to YCbCr can be rearranged to yield Cr and Cb as the functions: Cb=0.56433×(B−Y), and Cr=0.71327×(R−Y). Meanwhile, the image message 44 in the YCbCr color space is obtained.

Figure 6C:
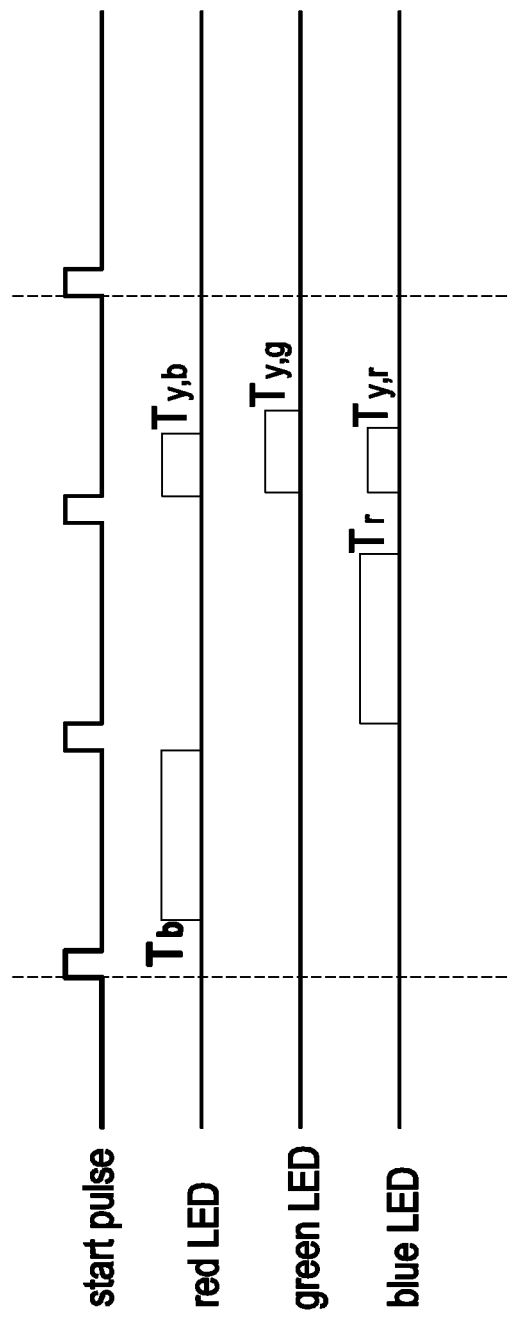
FIG. 6C is a schematic timing waveform diagram illustrating the relations between the start pulses and the on durations of respective LEDs according to another scan controlling method of the present invention.

FIG. 6C is a schematic timing waveform diagram illustrating the relations between the start pulses and the on durations of respective LEDs according to an other scan controlling method of the present invention. In this embodiment, the first light source 411 is a blue LED, the second light source 412 is a red LED, and the third light source 413 is a green LED. That is, the sequence of turning on the red LED and the blue LED may be exchanged. Assuming that the first on duration is Tb, the second on duration is Tr and a given third on duration is Tg, the first minor on duration Ty,b=0.114×Tb, the second minor on duration Ty,r=0.299×Tr and the third minor on duration Ty,g=0.587×Tg. Similarly, a first image data value B is obtained during the first light source 411 (blue LED) is turned on for the first on duration Tb, a second image data value R is obtained during second light source 412 (red LED) is turned on for a second on duration Tr, and a third image data value Y is obtained during the three light sources are turned on. As a consequence, the equations mapping RGB to YCbCr can be rearranged to yield Cr and Cb as the functions: Cb=0.56433×(B−Y), and Cr=0.71327×(R−Y).

Figure 7:
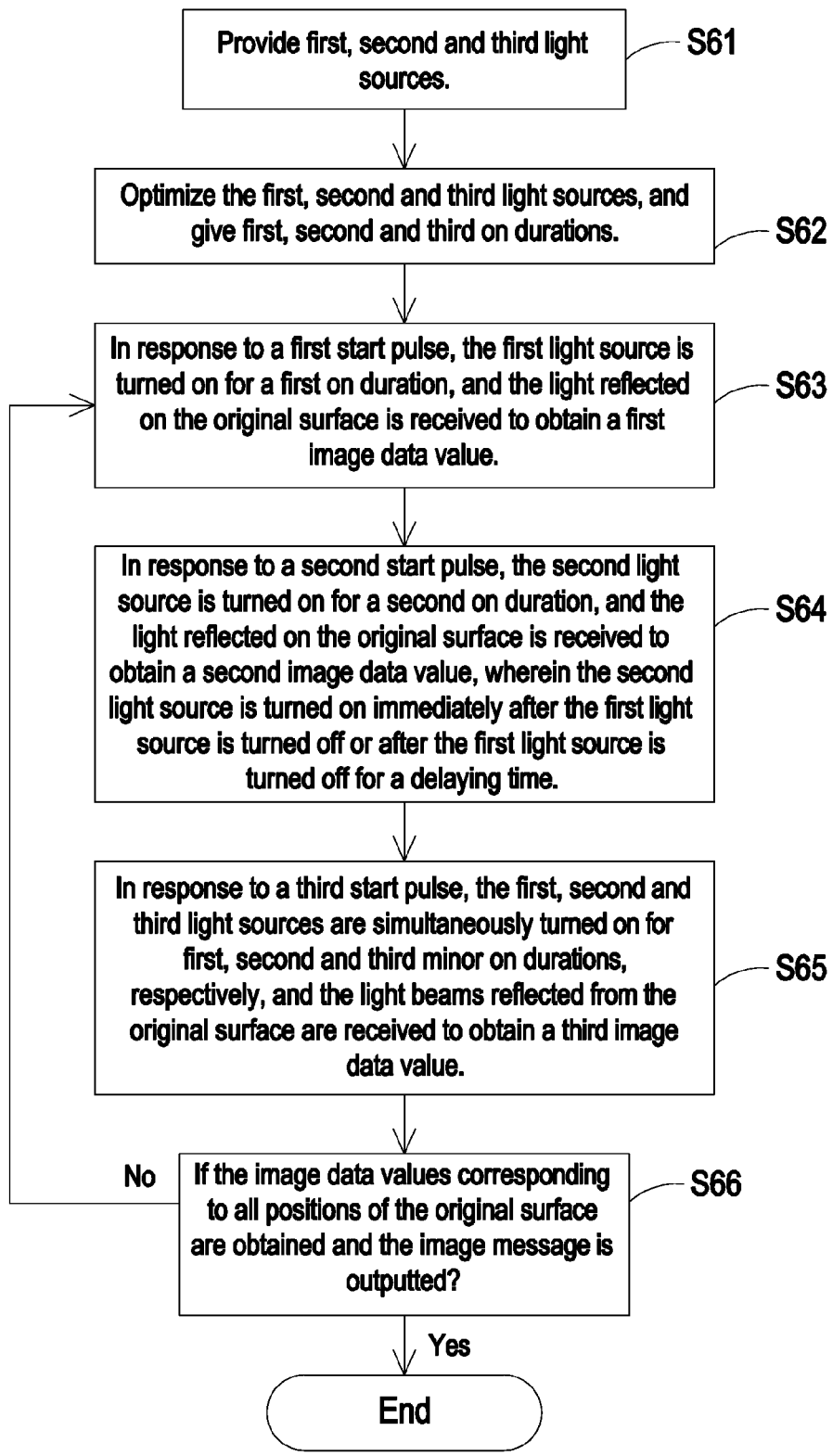
FIG. 7 is a flowchart illustrating a scan controlling method of a contact-type image scanner according to the present invention.

FIG. 7 is a flowchart illustrating a scan controlling method of a contact-type image scanner according to the present invention. Firstly, a first light source 411, a second light source 412 and a third light source 413 are provided to linearly move with respect to an original surface 40 and respectively emit different color light beams on the original surface 40 (Step S61). In an embodiment, the first light source 411 is a red LED, the second light source 412 is a blue LED, and the third light source 413 is a green LED. Before the scanning operation on the original surface 40 is performed, the first light source 411, the second light source 412 and the third light source 413 are optimized according to the period of the start pulse. In addition, the first on duration is Tb, the second on duration Tr and the third on duration Tg are given (Step S62). As a consequence, the image data values are obtained when the light beams are reflected by the original surface 40 lie within optimal ranges.

The contact-type image scanner 4 is continuously moved with respect to the original surface 40. In response to a first start pulse, the first light source 411 is turned on for a first on duration Tr, and the light reflected on the original surface 40 is received to obtain a first image data value R (Step S63).

Sequentially, in response to a second start pulse, the second light source 412 is turned on for a second on duration Tb, wherein the second light source 412 is turned on immediately after the first light source 411 is turned off or after the first light source 411 is turned off for a delaying time. At the same time, the light reflected on the original surface 40 is received to obtain a second image data value B (Step S64). Sequentially, in response to a third start pulse, the first light source 411, the second light source 412 and the third light source 413 are simultaneously turned on for a first minor on duration Ty,r, a second minor on duration Ty,b and a third minor on duration Ty,g, respectively. At the same time, the light reflected on the original surface 40 is received to obtain a third image data value Y (Step S65). The image message in the RGB color space is converted into the image message in the YCbCr color space. As such, the first minor on duration Ty,r=0.299×Tr, the second minor on duration Ty,b=0.114×Tb, and the third minor on duration Ty,g=0.587×Tg. The contact-type image scanner 4 is continuously moved with respect to the original surface 40, and the steps S63, S64 and S65 are repeatedly done until the image data values R, B and Y corresponding to all positions of the original surface 40 are obtained by the photo-sensing unit 43. As a consequence, the equations mapping RGB to YCbCr can be rearranged to yield Cr and Cb as the functions: Cb=0.56433×(B−Y), and Cr=0.71327×(R−Y). Meanwhile, the image message 44 in the YCbCr color space is obtained.

In the above embodiments, the sequence of turning on the red LED and the blue LED may be exchanged without influencing the result of outputting the image message in the YCbCr color space. For achieving a reduced unit scanning time interval, the longer on duration is followed by the shorter on duration. For example, if the on duration of the blue LED is longer than the on duration of the red LED, the red LED is served as the first light source, and the blue LED is served as the second light source. As previously described in the prior art, it takes about a three-pulse length to perform a unit scanning operation by turning on the red, blue and green LEDS. According to the present invention, the overall time interval is shortened by controlling the on durations and sequences of the red, green and blue LEDs. As shown in FIG. 6, the overall time interval from the beginning of the first on duration Tr to the termination of the third minor on duration Ty,g is the shortest when compared with any prior art technology. In other words, the color misregistration is minimized.

In some embodiments, the step of acquiring the image data value Y is earlier than the step of acquiring the image data values R and B. In other words, the image data values Y, R and B may be sequentially obtained, or the image data values Y, B and R may be sequentially obtained. In an embodiment, the first light source 411, the second light source 412 and the third light source 413 are simultaneously turned on for the first minor on duration Ty,r, the second minor on duration Ty,b and the third minor on duration Ty,g, respectively, and thus the light reflected on the original surface 40 is received to obtain the third image data value Y. After the third image data value Y is obtained, the first image data value R and the second image data value B are obtained according to the above method. As a consequence, the same image message in the YCbCr color space will be outputted.

From the above description, the present invention provides a contact-type image scanner and a scan controlling method of the contact-type image scanner. By controlling the on durations and sequences of the red, green and blue LEDs, the scanning position error of the three primary colors is reduced and the color misregistration is minimized. According to the practical requirements, the RGB color space may be converted into YCbCr or CMYB color space.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A contact-type image scanner, comprising:
an illumination unit comprising a first light source, a second light source and a third light source for respectively emitting different color light beams on an original surface;
a control unit in communication with said illumination unit for controlling on durations of said first light source, said second light source and said third light source, wherein in response to a first start pulse, said first light source is turned on for a first on duration, in response to a second start pulse, said second light source is turned on for a second on duration, and in response to a third start pulse, said first, second and third light sources are simultaneously turned on for a first minor on duration, a second minor on duration and a third minor on duration, respectively, wherein said second light source is turned on immediately after said first light source is turned off or after said first light source is turned off for a delaying time; and
a photo-sensing unit for receiving said light beams reflected from said original surface and outputting an image message, wherein said photo-sensing unit obtains a first image data value during said first on duration, obtains a second image data value during a second on duration and obtains a third image data during said first, second and third minor on durations.

2. The contact-type image scanner according to claim 1 wherein said image message is in YCbCr color space.

3. The contact-type image scanner according to claim 2 wherein said first light source is a red LED, said second light source is a blue LED, and said third light source is a green LED.

4. The contact-type image scanner according to claim 3 wherein when said first on duration is Tr, said second on duration is Tb and a given third on duration is Tg, said first minor on duration Ty,r=0.299×Tr, said second minor on duration Ty,b=0.114×Tb and said third minor on duration Ty,b=0.587×Tg.

5. The contact-type image scanner according to claim 4 wherein when said first image data value is R, said second image data value is B and said third image data value is Y, said image message in said YCbCr color space includes Cb=0.56433×(B−Y) and Cr=0.71327×(R−Y).

6. The contact-type image scanner according to claim 5 wherein said first image data value, said second image data value and said third image data value are sequentially obtained, or said third image data value, said first image data value, said second image data value are sequentially obtained.

7. The contact-type image scanner according to claim 2 wherein said first light source is a blue LED, said second light source is a red LED, and said third light source is a green LED.

8. The contact-type image scanner according to claim 7 wherein when said first on duration is Tb, said second on duration is Tr and a given third on duration is Tg, said first minor on duration Ty,b=0.114×Tb, said second minor on duration Ty,r=0.299×Tr and said third minor on duration Ty,b=0.587×Tg.

9. The contact-type image scanner according to claim 8 wherein when said first image data value is B, said second image data value is R and said third image data value is Y, said image message in said YCbCr color space includes Cb=0.56433×(B−Y) and Cr=0.71327×(R−Y).

10. The contact-type image scanner according to claim 9 wherein said first image data value, said second image data value and said third image data value are sequentially obtained, or said third image data value, said first image data value, said second image data value are sequentially obtained.

11. A scan controlling method of a contact-type image scanner, said scan controlling method comprising steps of:
(a) providing a first light source, a second light source and a third light source to linearly move with respect to an original surface and respectively emit different color light beams on said original surface;
(b) turning on said first light source for a first on duration in response to a first start pulse, and receiving said light beam reflected from said original surface, thereby generating a first image data value;
(c) turning on said second light source for a second on duration in response to a second start pulse, and receiving said light beam reflected from said original surface, thereby generating a second image data value, wherein said second light source is turned on immediately after said first light source is turned off or after said first light source is turned off for a delaying time; and
(d) simultaneously turning on said first light source for a first minor on duration, said second light source for a second minor on duration and said third light sources for a third minor on duration in response to a third start pulse, and receiving said light beam reflected from said original surface, thereby generating a third image data value.

12. The scan controlling method according to claim 11 wherein each of said first on duration, said second on duration, said first minor on duration, said second minor on duration and said third minor on duration is shorter than a period of said pulse.

13. The scan controlling method according to claim 11 wherein said image message is in YCbCr color space.

14. The scan controlling method according to claim 13 wherein said first light source is a red LED, said second light source is a blue LED, and said third light source is a green LED.

15. The scan controlling method according to claim 14 wherein when said first on duration is Tr, said second on duration is Tb and a given third on duration is Tg, said first minor on duration Ty,r=0.299×Tr, said second minor on duration Ty,b=0.114×Tb and said third minor on duration Ty,b=0.587×Tg.

16. The scan controlling method according to claim 15 wherein when said first image data value is R, said second image data value is B and said third image data value is Y, said image message in said YCbCr color space includes Cb=0.56433×(B−Y) and Cr=0.71327×(R−Y).

17. The scan controlling method according to claim 13 wherein said first light source is a blue LED, said second light source is a red LED, and said third light source is a green LED.

18. The scan controlling method according to claim 17 wherein when said first on duration is Tb, said second on duration is Tr and a given third on duration is Tg, said first minor on duration Ty,b=0.114×Tb, said second minor on duration Ty,r=0.299×Tr and said third minor on duration Ty,b=0.587×Tg.

19. The scan controlling method according to claim 18 wherein when said first image data value is B, said second image data value is R and said third image data value is Y, said image message in said YCbCr color space includes Cb=0.56433×(B−Y) and Cr=0.71327×(R−Y).

* * * * *